Patented Oct. 20, 1925.

1,557,879

UNITED STATES PATENT OFFICE.

CHARLES G. RICHARDSON, OF ELIZABETH, NEW JERSEY.

PROCESS FOR SEPARATING COBALT FROM NICKEL.

No Drawing.     Application filed November 8, 1921. Serial No. 513,849.

*To all whom it may concern:*

Be it known that I, CHARLES G. RICHARDSON, a subject of the King of Great Britain, residing at Elizabeth, county of Union, and State of New Jersey, have invented certain new and useful Improvements in Processes for Separating Cobalt from Nickel, fully described and represented in the following specification, and the accompanying drawings, forming a part of the same.

The following described invention relates to a new and novel method of obtaining cobalt from ores or metallurgical products containing both cobalt and nickel.

The method of conducting the process may be described as follows:

The cobalt and nickel, along with some other metals is first collected in a "speiss", or mixture of arsenides and antimonides of the metals present, by any known method.

This speiss is first freed from other metallic impurities such as iron, lead, and copper, by oxidation or treatment with sulphur or sulfur compounds by means known and previously practiced, so that there finally results a speiss consisting essentially of cobalt and nickel arsenides and antimonides, but free from other metallic impurities.

It is for the treatment of this purified speiss for the separation of the nickel from the cobalt, that this invention relates.

The purified speiss is subjected to a roasting operation by which a portion of its arsenic is oxidized and volatilized so that in the resulting product there remains only sufficient arsenic and antimony for combination with the nickel present but none for combination with the cobalt. In case the roasting has removed more than the proper amount of the arsenic, a certain amount of unroasted speiss will be mixed with the roasted product, thus obtaining a mixture in which the amount of arsenic and antimony present is just sufficient to combine with the nickel present but leaving none to combine with the cobalt.

Another method which may be used is to mix with the unroasted speiss sufficient nickel as nickel oxide, or other nickel compound so that in the resulting mixture there may be sufficient nickel to combine with all of the arsenic and antimony present, leaving no arsenic or antimony to combine with the cobalt.

The mixture obtained by any of the above methods is then fused along with suitable fluxes in a smelting furnace so that a new speiss may be obtained containing the nickel, arsenic and antimony, and a slag containing the cobalt, the slag and speiss being separated from each other by settling in pots, or by other known methods.

It has been further found that if a fluxing medium composed of sodium sulfide, or of sodium sulfate in the form of niter cake mixed with the proper amount of carbon or other suitable reducing agent, be used there will be obtained a very fusible and free running slag which separates easily from the speiss formed, and further that the slag will easily dissolve the cobalt as cobalt sulfide, without dissolving any appreciable amount of arsenic, antimony or nickel.

By the above means therefore I have discovered a novel and efficient method of separating nickel and cobalt from each other in such a way that the resulting products are practically free from contamination by the other elements, that is the nickel is obtained in a product practically free from cobalt, and the cobalt in a product practically free from nickel, arsenic, or antimony.

The speiss may be further treated by any known method for the recovery of nickel, arsenic, and antimony.

The slag containing the cobalt will be treated as follows:

It is first allowed to weather for a suitable length of time, and then finely ground and subjected to a leaching process for the removal of soluble salts, the residue of insoluble cobalt sulfide or other cobalt compounds, being finally separated from the solution, and washed free from soluble salts by settling, decantation, filtration, or other known means, and the residue of cobalt compounds treated for the recovery of cobalt, or the preparation of cobalt compounds by known methods.

Having thus described the nature of the invention and the manner of carrying it out, the following claims are made.

1. In the treatment of speisses containing nickel, cobalt, arsenic and antimony, the process which consists of roasting the said speiss to such a point that an amount of arsenic equivalent to the amount necessary for combination with the cobalt has been eliminated.

2. In the treatment of spiesses containing cobalt, nickel, arsenic and antimony, the process which consists in the roasting of a portion of the speiss for the elimination of a portion of its arsenic, and the mixing of the resulting roasted speiss with such an amount of unroasted speiss that the resulting mixture will contain only sufficient arsenic and antimony for combination with the nickel present, with no excess present for combination with the cobalt present, and the subsequent fusion of the mixture with suitable fluxes for the formation of a new cobalt free speiss and a slag containing the cobalt, with a final separation of the speiss from the slag.

3. In the treatment of speisses containing cobalt, nickel, arsenic, and antimony by a process in which a mixture is formed containing just sufficient arsenic and antimony for combination with the nickel present, but having no excess arsenic or antimony present for combination with the cobalt, is fused with fluxes for the production of a new speiss containing the nickel, and a slag containing the cobalt, with final separation of the speiss from the slag, the process which uses sodium sulfide as a flux in order that the cobalt may be completely absorbed, without contamination with nickel, arsenic or antimony.

4. In the treatment of speisses containing cobalt, nickel, arsenic and antimony by a process in which a mixture is formed having just sufficient arsenic and antimony present for combination with the nickel present, but having no excess present for combination with the cobalt, is fused with fluxes for the production of a new speiss containing the nickel, and a slag containing the cobalt, the process which uses a flux consisting of niter cake, or other form of sodium sulfate mixed with sufficient carbon for reduction to sodium sulfide, in order that the resulting slag may completely absorb the cobalt without being contaminated with arsenic, antimony or nickel.

5. The process of obtaining cobalt from a speiss containing arsenides and antimonides of cobalt and nickel which comprises treating the speiss in such a manner as to form a mixture containing just sufficient arsenic and antimony for combination with the nickel, but having no excess arsenic or antimony present for combination with the cobalt, fusing the mixture with a suitable flux to form a new speiss containing the nickel and a slag containing the cobalt, and then treating the slag to obtain the cobalt.

6. The process of obtaining cobalt from a speiss containing arsenides and antimonides of cobalt and nickel which comprises roasting the speiss to form a mixture containing just sufficient arsenic and antimony for combination with the nickel but none for combination with the cobalt, adding a suitable flux and fusing and then treating the slag to recover the cobalt.

7. The process of obtaining cobalt from a purified speiss containing antimonides and arsenides of cobalt and nickel, which comprises roasting the speiss until a portion of the arsenic is oxidized and volatilized and the resulting mixture contains only sufficient arsenic and antimony for combination with the nickel and none for combination with the cobalt, adding unroasted speiss in suitable quantity to satisfy the aforesaid condition if not prevalent, adding a fluxing agent consisting of sodium sulphate in the form of niter coke mixed with carbon and fusing the same, allowing the fused leaching to remove soluble salts, and treating the residue by known methods to obtain the cobalt.

In testimony whereof I have hereunto set my hand.

CHARLES G. RICHARDSON.